(12) United States Patent  
Sadeg et al.

(10) Patent No.: US 12,276,180 B2  
(45) Date of Patent: Apr. 15, 2025

(54) HYDROGELS FOR CARBON SEQUESTRATION AND SEALING ZONES IN A WELLBORE

(71) Applicant: Saudi Arabian Oil Company, Dhahran (SA)

(72) Inventors: Hala Sadeg, Dhahran (SA); Amr Abdel-Fattah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/319,169

(22) Filed: May 17, 2023

(65) Prior Publication Data

US 2024/0384626 A1    Nov. 21, 2024

(51) Int. Cl.  
*E21B 41/00* (2006.01)  
*C09K 8/42* (2006.01)  
*C09K 8/44* (2006.01)  
*E21B 33/138* (2006.01)

(52) U.S. Cl.  
CPC .......... *E21B 41/0064* (2013.01); *C09K 8/426* (2013.01); *C09K 8/44* (2013.01); *E21B 33/138* (2013.01)

(58) Field of Classification Search  
CPC .......... C09K 8/426; C09K 8/44; E21B 33/138  
See application file for complete search history.

(56) References Cited

U.S. PATENT DOCUMENTS

| | | | |
|---|---|---|---|
| 8,969,261 B2 | 3/2015 | Talingting Pabalan et al. | |
| 9,770,583 B2 | 9/2017 | Gupta et al. | |
| 2009/0264321 A1 | 10/2009 | Showalter et al. | |
| 2010/0038086 A1 | 2/2010 | Bunnell et al. | |
| 2010/0314114 A1 | 12/2010 | Moradi-Araghi et al. | |
| 2012/0138303 A1* | 6/2012 | Welton ..................... | C09K 8/72 166/300 |
| 2012/0190593 A1 | 7/2012 | Soane et al. | |
| 2015/0196585 A1 | 7/2015 | Young et al. | |
| 2016/0230062 A1* | 8/2016 | Beuterbaugh ......... | E21B 43/164 |
| 2017/0138149 A1* | 5/2017 | Muthusamy .......... | C08F 220/68 |

(Continued)

FOREIGN PATENT DOCUMENTS

| | | |
|---|---|---|
| AU | 2011284552 | 12/2013 |
| EA | 024705 | 10/2016 |

(Continued)

OTHER PUBLICATIONS

Asoh et al., "Electrophoretic adhesion of stimuli-responsive hydrogels," Chemical Communications, Sep. 27, 2010, 46(41):7793-7795, 3 pages.

(Continued)

*Primary Examiner* — Silvana C Runyan  
(74) *Attorney, Agent, or Firm* — Fish & Richardson P.C.

(57) ABSTRACT

A method is provided for sequestering carbon dioxide while treating a zone in a wellbore. The method includes obtaining a hydrogel, mixing the hydrogel with an aqueous amine solution to form an amine infused hydrogel (AIH), and exposing the AIH to a gas comprising carbon dioxide, wherein the amine and the AIH absorbs the carbon dioxide, forming a well treatment composition. The well treatment composition is pumped into a wellbore comprising a treatment zone, wherein the well treatment composition at least partially plugs the treatment zone.

18 Claims, 5 Drawing Sheets

(56) References Cited

U.S. PATENT DOCUMENTS

| | | | | |
|---|---|---|---|---|
| 2019/0292435 | A1* | 9/2019 | Goodman | C07D 403/12 |
| 2019/0351390 | A1* | 11/2019 | Wood | B01J 20/321 |
| 2020/0370404 | A1* | 11/2020 | Gizzatov | C09K 8/80 |
| 2022/0049035 | A1 | 2/2022 | Abdel-Fattah et al. | |
| 2022/0362782 | A1 | 11/2022 | Abang et al. | |

FOREIGN PATENT DOCUMENTS

| | | |
|---|---|---|
| TW | 200643094 | 12/2006 |
| WO | WO 2005073501 | 8/2005 |
| WO | WO 2011009867 | 1/2011 |
| WO | WO 2015013306 | 1/2015 |
| WO | WO 2016100647 | 6/2016 |
| WO | WO 2017027018 | 2/2017 |
| WO | WO 2018031655 | 2/2018 |
| WO | WO 2019204142 | 10/2019 |

OTHER PUBLICATIONS

Asoh et al., "Rapid fabrication of reconstructible hydrogels by electrophoretic microbead adhesion," Chemical Communications, Aug. 21, 2012, 48(80):10019-10021, 3 pages.

Bai et al., "A comprehensive review of polyacrylamide polymer gels for conformance control," Petroleum Exploration and Development, Aug. 4, 2015, 42(4):525-532, 8 pages.

Blackpowdersolutions.com [online], "Magnetic Separator Systems," Available on or before May 8, 2021, via Internet Archive: Wayback Machine URL <https://web.archive.org/web/20210508050117/https://blackpowdersolutions.com/ma gnetic-separator-systems/>, retrieved on Jan. 25, 2024, URL <https://blackpowdersolutions.com/magnetic-separator-systems/>, 17 pages.

Energynow.com [online], "Technical Report: Amine Sweetening Units—Can magnetic separation improve reliability and reduce filtration costs?," Dec. 18, 2019, retrieved on Jan. 25, 2024, retrieved from URL <https://energynow.com/2019/12/technical-report-amine-sweetening-units-can-magnetic-separation-improve-reliability-and-reduce-filtration-costs/>, 11 pages.

Frampton et al., "Development of a novel waterflood conformance control system," SPE 89391, SPE/DOE Symposium on Improved Oil Recovery. Society of Petroleum Engineers, 2004, 9 pages.

Gong et al., "Electrokinetic modeling of the contractile phenomena of polyelectrolyte gels. One-dimensional capillary model," The Journal of Physical Chemistry, 1994, 98(38):9583-9587, 5 pages.

Gupta et al., "Hydrogels: from controlled release to pH-responsive drug delivery," Drug Discovery Today, May 10, 2002, 7(10):569-579, 11 pages.

Han et al., "Polymer Gels Used in Oil-Gas Drilling and Production Engineering," Gels, Oct. 7, 2022, 8(637):1-30, 30 pages.

Kabiri et al., "Superabsorbent hydrogel composites," Polymers for Advanced Technologies, 2003, 14(6):438-444, 7 pages.

Kim et al., "Enhanced Kinetic Performance of Amine-Infused Hydrogels for Separating CO2 from CH4/CO2 Gas Mixture," Energy & Fuels, Aug. 11, 2021, 35(17):13889-13899, 11 pages.

Kiremitçi et al., "Production of highly crosslinked hydrophilic polymer beads: effect of polymerization conditions on particle size and size distribution," Polymer, 1992, 33(15):3257-3261, 5 pages.

Kwon et al., "Drug release from electric current sensitive polymers," Journal of Controlled Release, 1991, 17(2):149-156, 6 pages.

Mack et al., "In-depth colloidal dispersion gels improve oil recovery efficiency," SPE/DOE 27780 improved oil recovery symposium, Society of Petroleum Engineers, 1994, 527-539, 13 pages.

Osada et al., "A polymer gel with electrically driven motility," Nature, Jan. 16, 1992, 355, 242-244, 3 pages.

Qiu et al., "Environment-sensitive hydrogels for drug delivery," Advanced Drug Delivery Reviews, Sep. 13, 2012, 64:49-60, 12 pages.

Sawahata et al., "Electrically controlled drug delivery system using polyelectrolyte gels," Journal of Controlled Release, 1990, 14(3):253-262, 10 pages.

Shiga et al., "Electric field-associated deformation of polyelectrolyte gel near a phase transition point," Journal of Applied Polymer Science, 1992, 46(4):635-640, 6 pages.

Tanaka et al., "Collapse of gels in an electric field," Science, Oct. 29, 1982, 218(4571):467-469, 3 pages.

Wang et al., "Preparation and characterization of a novel pH-sensitive chitosan-g-poly (acrylic acid)/attapulgite/sodium alginate composite hydrogel bead for controlled release of diclofenac sodium," Carbohydrate Polymers, Jun. 14, 2009, 78(4):731-737, 7 pages.

White et al., "Amine-Infused Hydrogels with Nonaqueous Solvents: Facile Platforms to Control CO2 Capture Performance," Ind. Eng. Chem. Res., Oct. 5, 2021, 60(41):14758-14767, 10 pages.

Wsimg.com [online], "Magnetic Filtration for Iron Sulfide & Iron Oxide Removal," Available on or before Jul. 16, 2020, retrieved on Jan. 25, 2024, retrieved from URL <https://img1.wsimg.com/blobby/go/0337b61a-d8fc-4d81-a558-c88677c1492c/downloads/Amine%20Optimization%20-%20Magnetic%20Filtration.pdf?ver=1618273799964>, 1 page.

Xu et al., "Carbon capture by DEA-infused hydrogels," International Journal of Greenhouse Gas Control, Jun. 20, 2019, 88:226-232, 7 pages.

Xu et al., "Carbon capture with polyethylenimine hydrogel beads (PEI HBs)," Journal of Materials Chemistry A, Oct. 24, 2018, 43(6):21468-21474, 7 pages.

Xu et al., "CO2 capture by amine infused hydrogels (AIHs)," Journal of Materials Chemistry A, Mar. 1, 2018, 11(6):4829-4838, 10 pages.

Xue et al., "Preparation and Evaluation of Thermo-and Salinity-Responsive Hydrogel as Intelligent Plugging Agent," SPE-184532-MS, SPE International Conference on Oilfield Chemistry, Society of Petroleum Engineers, 2017, 9 pages.

Zhang et al., "Synthesis and characterization of chitosan-g-poly (acrylic acid)/attapulgite superabsorbent composites," Carbohydrate Polymers, Jan. 17, 2007, 68(2):367-374, 8 pages.

* cited by examiner

HYDROGELS FOR CARBON SEQUESTRATION AND SEALING ZONES IN A WELLBORE

TECHNICAL FIELD

This disclosure relates to methods of sequestering carbon dioxide while treating zones.

BACKGROUND

A current industry challenge is that larger number of highly-swept hydrocarbon reservoirs suffer from early water breakthrough problems. In many cases, the injected water preferably flows through highly permeable reservoir layers, thereby bypassing a significant volume of the trapped oil in the reservoir. This has a number of undesired outcomes, including reducing the amount of oil recovered and increasing the volumes of produced water, thus the operational expenses necessary to treat this produced water. Many technologies have been developed to decrease water production, plug loss-circulation zones, and improve sweep efficiency. Among these technologies, gel-plugging agents are widely used due to their facile preparation, good applicability, and low cost. Hydrogels can create an impermeable barrier to optimize water injection profile, improve sweep efficiency, and seal undesirable permeable zones. They have been effectively employed as a water management material for profile control and water shutoff treatments in low-middle temperature and low-middle salinity reservoirs.

SUMMARY

An embodiment described herein provides a method for sequestering carbon dioxide while treating a zone in a wellbore. The method includes obtaining a hydrogel, mixing the hydrogel with an aqueous amine solution to form an amine infused hydrogel (AIH), and exposing the AIH to a gas comprising carbon dioxide, wherein the amine and the AIH absorbs the carbon dioxide, forming a well treatment composition. The well treatment composition is pumped into a wellbore comprising a treatment zone, wherein the well treatment composition at least partially plugs the treatment zone.

DETAILED DESCRIPTION

Embodiments described herein provide amine infused hydrogels (AIH) that are saturated with carbon dioxide as plugging agents while sequestering carbon dioxide ($CO_2$). In the method, hydrogels, for example, less than about 1000 μm in size when dry, are synthesized and infused with an amine, by swelling the hydrogels in an aqueous solution that includes an organic amine. The hydrogels are exposed to carbon dioxide and the amines absorb the $CO_2$. The $CO_2$ saturated hydrogels are then injected into a reservoir, for example, to plug a loss circulation zone, a water production zone, and the like. The $CO_2$ in the hydrogels is then sequestered in the well.

Figure 1:
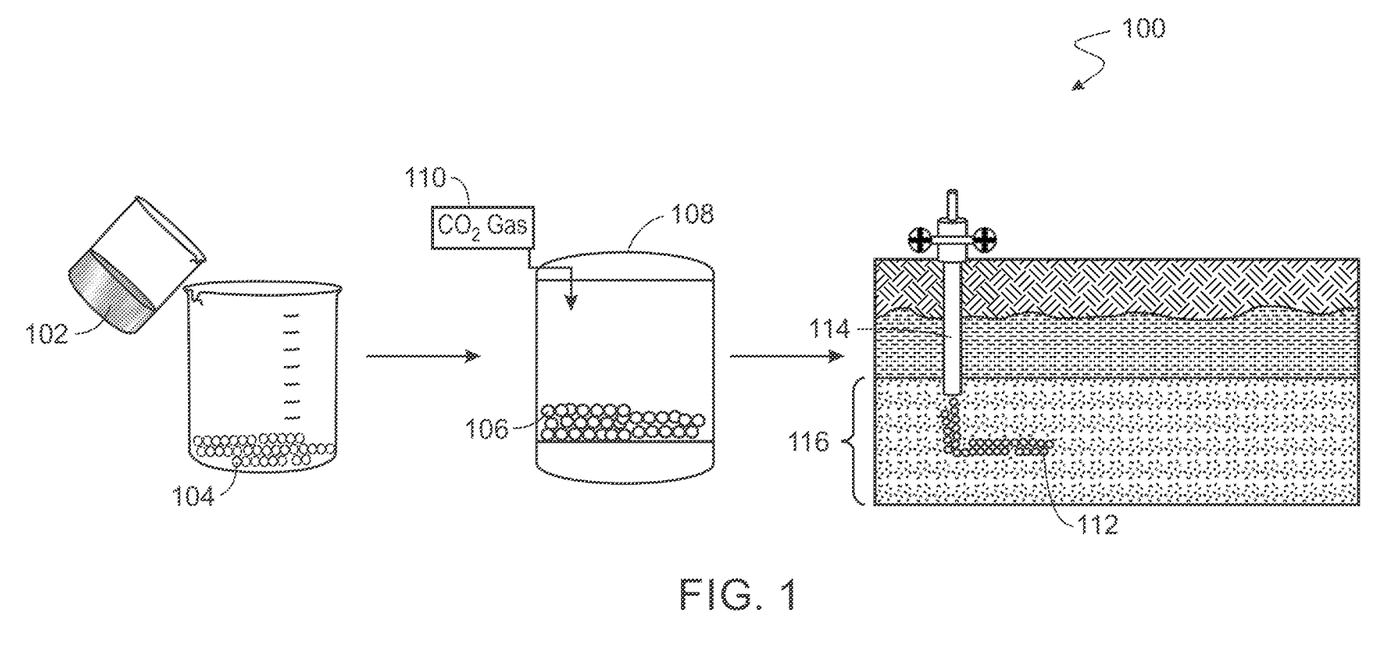
FIG. 1 is a schematic drawings of a process for sequestering carbon dioxide in a wellbore.

FIG. 1 is a schematic drawing of a process 100 for sequestering carbon dioxide in a wellbore. In the process, an aqueous amine solution 102 is added to dry hydrogel particles 104. The dry hydrogel particles 104 swell in the aqueous amine solution 102, infusing the hydrogel particles with the amine compound. The swelled hydrogel particles 106 are placed in a vessel 108 and exposed to a gas 110 that includes carbon dioxide. The $CO_2$ is absorbed by the amine compound, forming a well treatment composition 112. The well treatment composition 112 is then injected through a wellbore 114 to plug a treatment zone 116, such as a loss circulation zone, a water production zone, and the like.

Figure 2A:
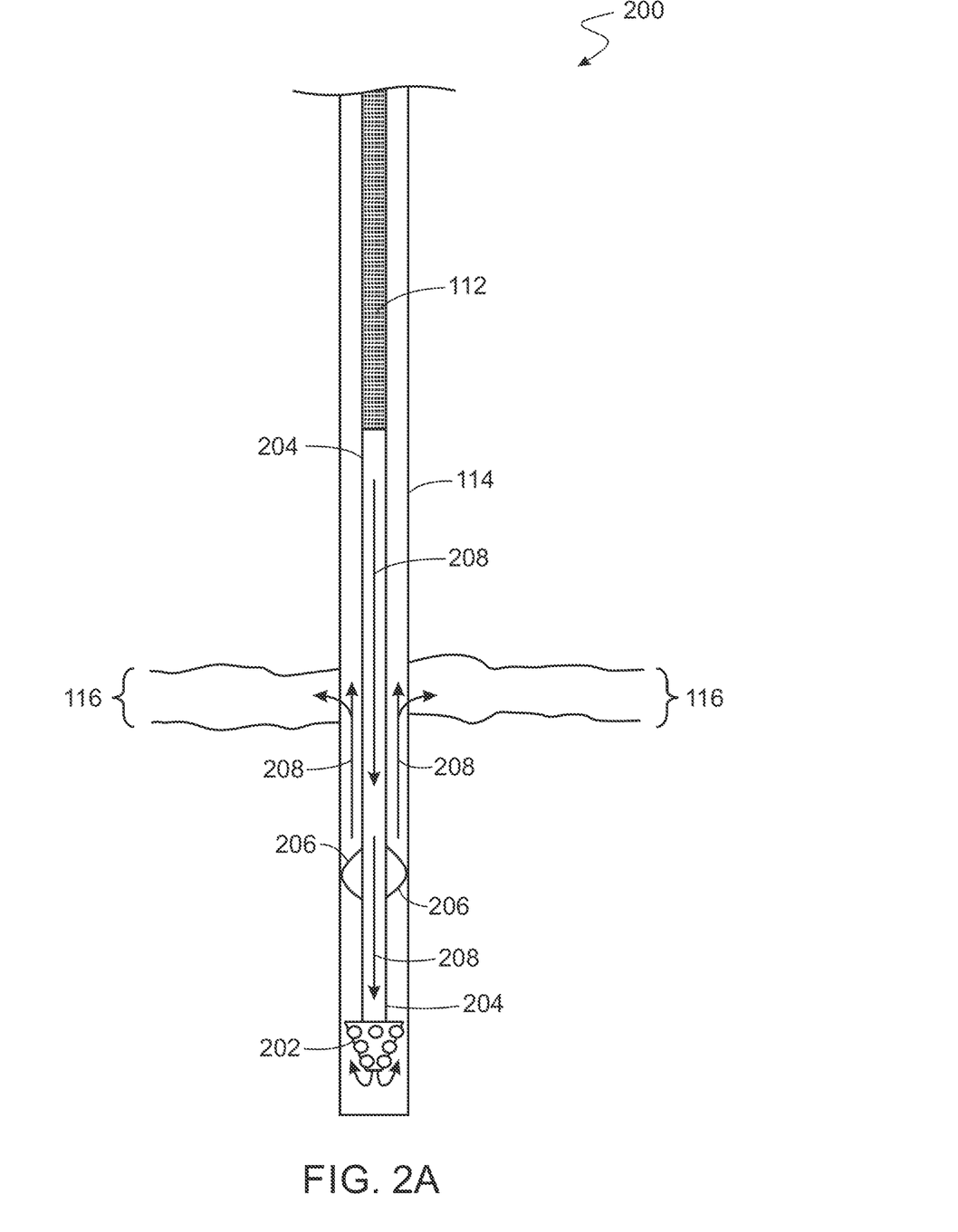
FIGS. 2A, 2B, and 2C are schematic drawings of a process for mitigating loss circulation in a wellbore.
Figure 2B:
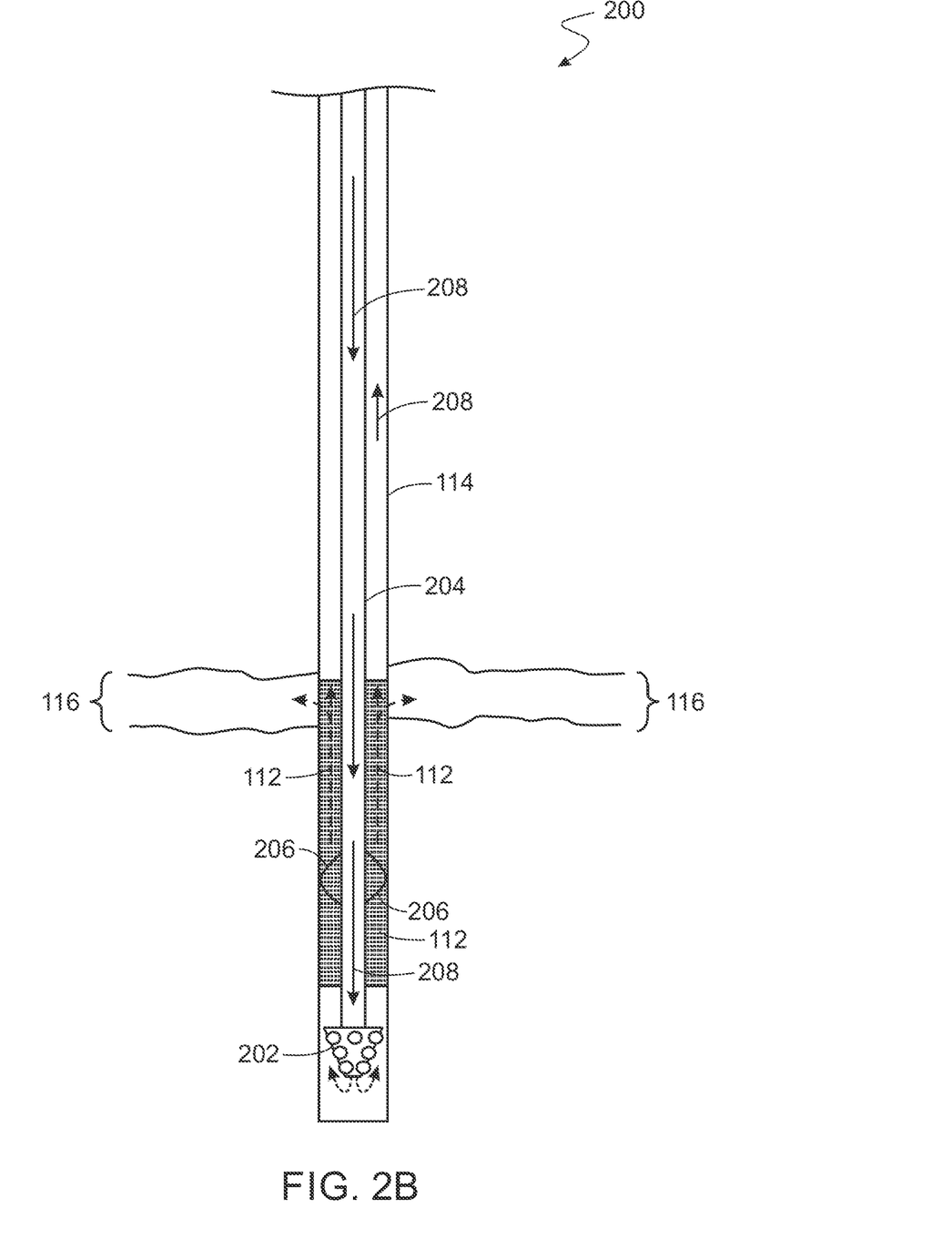
Figure 2C:
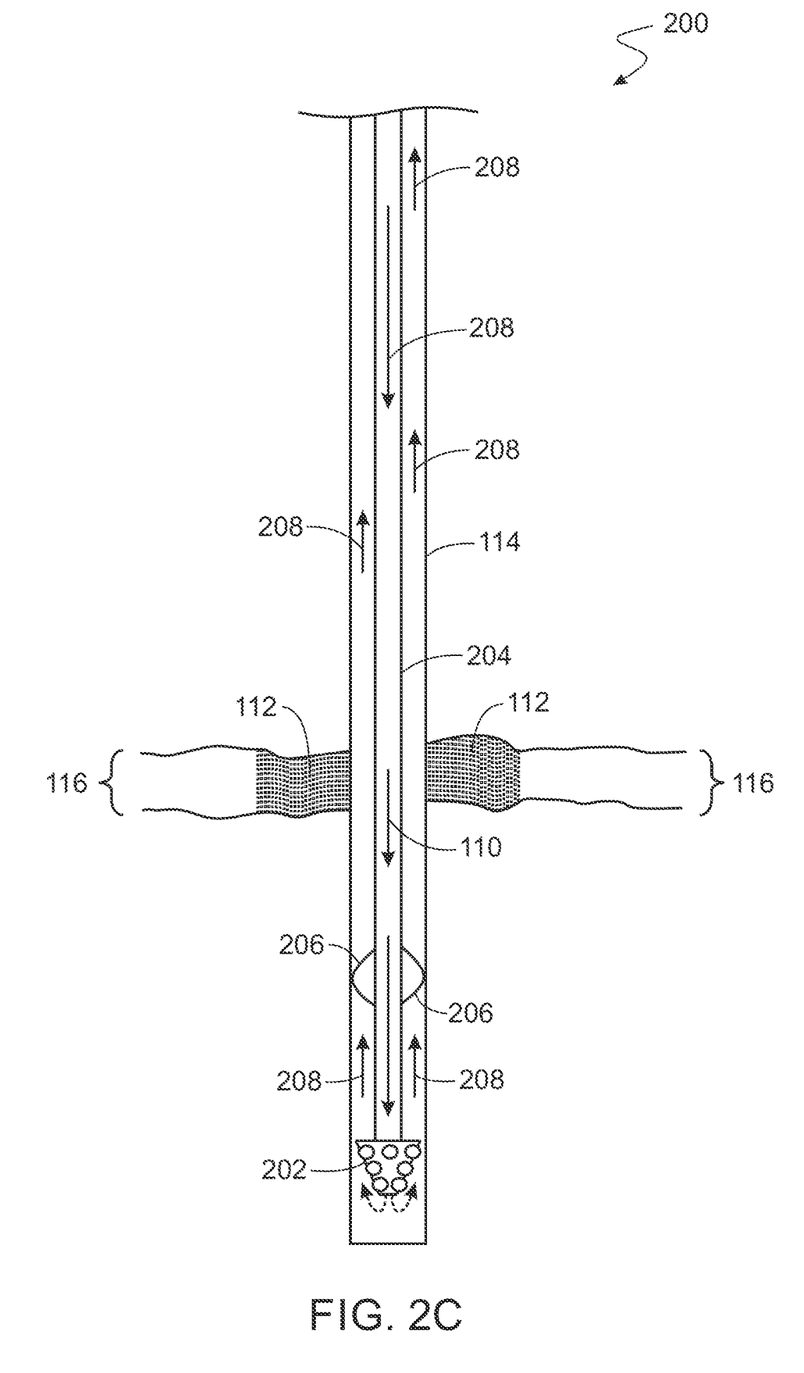

FIGS. 2A, 2B, and 2C are schematic drawings of a process 200 for treating a loss circulation zone in a wellbore 114. As noted herein, the techniques can materials described are not limited to loss circulation zones, but may be used for sealing water-producing zones. As shown in FIG. 2A, a drill bit 202 on a drill string 204 is drilling the wellbore 114. This is a simplified drawing as other units may be present. Further, the mitigation of loss circulation is not limited to the drilling process, but may be used at any time where loss circulation or excess water production occurs. For example, during a well work over, hydraulic fracturing, or other well treatments.

In the example shown in FIG. 2A, the drill string 204 may have centralizers 206 attached to the drill string 204 in the wellbore 114, which help to keep the drill bit 202 centered in the wellbore 114. Drilling mud 208 is circulated downhole through the drill string 204, and flows out through the drill bit 202. The drilling mud 208 then generally returns to the surface through the wellbore 114, carrying rock cuttings from the drill bit 202. The proportions of the drill string 204 and the wellbore 114 are not necessarily shown to scale to make it easier to see the process 200.

In this example, the drill bit 202 has penetrated a treatment zone 116, such as a permeable layer, into which at least a portion of the drilling mud 208 is lost and fails to return to the surface. The presence of the treatment zone 116 is detected by a decrease in the amount of drilling mud 208 returned to the surface in comparison to the amount pumped into the drill string 204. To mitigate the loss of the drilling mud 208 into the treatment zone 116, the well treatment composition 112 is injected into the drill string 204 to plug the treatment zone 116. As described herein, the well treatment composition 112 includes the hydrogels that have been saturated with carbon dioxide.

As shown in FIG. 2B, the well treatment composition 112 flows through the drill string 204, out through the drill bit 202, and back up the wellbore 114 through the annulus outside of the drill string 24. Upon reaching the treatment zone 1116, the well treatment composition 112 flows into the treatment zone 1116. The injection of the well treatment composition 112 may be padded by some amount of the drilling mud 208 to push the well treatment composition 112 into the treatment zone 116.

The well treatment composition 112 plugs the treatment zone 116, restoring the flow of the drilling mud 208 up the wellbore 114 to the surface. In embodiments in which the treatment zone 116 is a water-producing zone, forcing the hydrogels of the well treatment composition 112 into the pores of the water-producing zone will block the flow of water.

Figure 3:
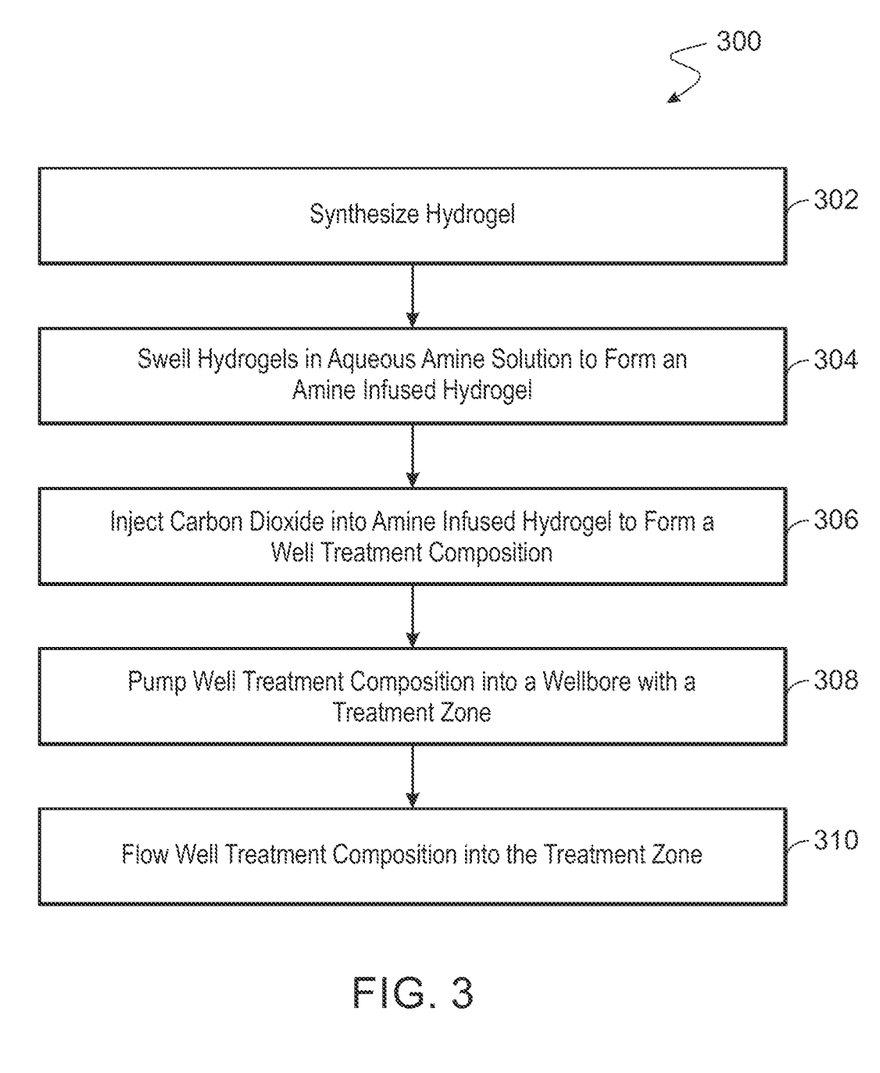
FIG. 3 is a process flowchart describing a method to use hydrogels that are saturated with carbon dioxide as a well treatment composition.

FIG. 3 is a flowchart describing a method 300 to use of well treatment composition to plug treatment zones in a wellbore while sequestering carbon dioxide. The method 300 begins at block 302 with the synthesis of a hydrogel. In one embodiments, the hydrogels may be purchased from Dulux Group Pty. Ltd. as Yates® water storage granules (referred to as hydrogel B).

Different hydrogels that may be used in embodiments include cross-linked poly (acrylic acid), cross-linked poly (N-2-hydroxyethylacrylamide), and cross-linked poly (acrylamide/sodium acrylate), among others.

The size of the swollen hydrogel can be selected based on the characteristics of the treatment zone, such as pore size, pressure, permeability, and the like. In some embodiments, the swollen hydrogel has a diameter of less than about 1500 nm, less than about 1000 nanometers, less than about 750 nm, or less than about 500 nm. In various embodiments, the swollen hydrogel has a diameter of between about 250 nm and about 1500 nm, or between about 500 nm and about 1000 nm, or about 750 nm.

At block 304, the hydrogels are swelled in an aqueous amine solution, for example, 30 wt. % amine in deionized water, to create an amine infused hydrogel (AIH). The amine can include any number of small molecule amines, such as monoethanol amine, diethanolamine, triethanolamine, 2-piperidineethanol, and N-ethyl monoethanolamine, among others.

At block 306, carbon dioxide is injected into the AIH to be absorbed by reaction with the amine. In some embodiments, the AIH is placed in a pressure or treatment vessel, and a carbon dioxide containing gas is added to the pressure vessel, for example, as discussed with respect to FIG. 1. The gas does not have to be pure carbon dioxide, but may be a mixture of carbon dioxide with other gases. This may provide further advantages, as an exhaust stream from a power plant, or other combustion process, may be passed over the AIH to remove the carbon dioxide from the exhaust stream, prior to releasing the exhaust stream to the atmosphere. In this example, the exhaust stream is cooled before flowing over the AIH to prevent damage to the hydrogel.

If the gas is pure carbon dioxide, the determination that the AIH is saturated, for example, has absorbed as much as it can, may be made by determining when the pressure on a pressure vessel with the AIH increases. For a mixed gas that contains carbon dioxide, the saturation of the AIH with carbon dioxide may be determined by the concentration of carbon dioxide in an effluent gas stream from the treatment vessel. After saturation with carbon dioxide, the AIH is termed a well treatment composition, herein.

At block 308, the well treatment composition is pumped through a wellbore to a treatment zone. For example, as discussed herein, the well treatment composition may be used to plug a loss circulation zone, or a water production zone, among others. Once the well treatment composition has been placed in the treatment zone, the carbon dioxide is sequestered. The sequestration may be permanent or nearly permanent.

At block 310, the well treatment composition is flowed into the treatment zone. In some embodiments, the well treatment composition naturally flows into a loss circulation zone, as the pressure in the wellbore is higher than the loss circulation zone. In other embodiments, the wellbore is pressurized to a pressure greater than a water-producing zone to force the well treatment composition into the water-producing zone. To prevent the well treatment composition from damaging other parts of the wellbore, such as the Reservoir, plugs may be placed above and below the water-producing zone at the well treatment composition may be injected between the plugs, for example, using a coiled tubing line.

EMBODIMENTS

An embodiment described herein provides a method for sequestering carbon dioxide while treating a zone in a wellbore. The method includes obtaining a hydrogel, mixing the hydrogel with an aqueous amine solution to form an amine infused hydrogel (AIH), and exposing the AIH to a gas comprising carbon dioxide, wherein the amine and the AIH absorbs the carbon dioxide, forming a well treatment composition. The well treatment composition is pumped into a wellbore comprising a treatment zone, wherein the well treatment composition at least partially plugs the treatment zone.

In an aspect, combinable with any other aspect, the hydrogel is a cross-linked poly (acrylic acid), a cross-linked poly (N-2-hydroxyethylacrylamide), or a cross-linked poly (acrylamide/sodium acrylate), or any combination thereof.

In an aspect, combinable with any other aspect, the method includes selecting the AIH to have a diameter of between about 250 nm and about 1500 nm.

In an aspect, combinable with any other aspect, the method includes selecting the AIH to have a diameter of about 750 nm.

In an aspect, combinable with any other aspect, the method includes selecting the amine from the group consisting of monoethanol amine, diethanolamine, triethanolamine, 2-piperidineethanol, and N-ethyl monoethanolamine, and combination thereof.

In an aspect, combinable with any other aspect, the method includes mixing the aqueous amine solution to a concentration of about 30 weight % amine in water.

In an aspect, combinable with any other aspect, the method includes injecting carbon dioxide into a vessel containing the AIH.

In an aspect, combinable with any other aspect, the method includes measuring a pressure of the vessel, and determining that the AIH has reached saturation when the pressure increases.

In an aspect, combinable with any other aspect, the method includes injecting a mixed gas stream into a vessel containing the AIH, wherein the mixed gas stream comprises carbon dioxide.

In an aspect, combinable with any other aspect, the method includes measuring a concentration of carbon dioxide in an effluent stream from the vessel, and determining that the AIH has reached saturation with the concentration of carbon dioxide in the effluent stream increases.

In an aspect, combinable with any other aspect, pumping the well treatment composition into a wellbore comprising a treatment zone, comprises plugging a loss composition zone.

In an aspect, combinable with any other aspect, pumping the well treatment composition into the wellbore comprising the treatment zone, comprises plugging a water production zone.

In an aspect, combinable with any other aspect, the well treatment composition comprises a surfactant.

In an aspect, combinable with any other aspect, the surfactant comprises a cationic surfactant, an anionic surfactant, or a zwitterionic surfactant, or any combination thereof.

In an aspect, combinable with any other aspect, the method includes pumping drilling mud after the well treatment composition to push the well treatment composition into the treatment zone.

In an aspect, combinable with any other aspect, the method includes selecting the hydrogel, at least in part, on well parameters.

In an aspect, combinable with any other aspect, the well parameters comprise a type of treatment zone, well pressure, treatment zone pressure, rock type, or pore size, or any combination thereof.

In an aspect, combinable with any other aspect, the method includes selecting an amine based, at least in part, on well parameters.

In an aspect, combinable with any other aspect, the well parameters comprise well pressure, or rock type, or both.

Other implementations are also within the scope of the following claims.

What is claimed is:

1. A method for sequestering carbon dioxide while treating a zone in a wellbore, comprising:
   obtaining a hydrogel;
   mixing the hydrogel with an aqueous amine solution comprising an amine compound to form an amine infused hydrogel (AIH);
   exposing the AIH to a gas comprising carbon dioxide in a vessel before treating the zone in the wellbore until the AIH has reached saturation with the carbon dioxide, wherein the amine compound in the AIH absorbs the carbon dioxide, forming a well treatment composition comprising the AIH and absorbed carbon dioxide, and wherein the saturation of the AIH with the carbon dioxide is determined by measuring a pressure of the vessel; and
   pumping the well treatment composition into a wellbore comprising a treatment zone, wherein the well treatment composition plugs the treatment zone.

2. The method of claim 1, wherein the hydrogel is a cross-linked poly (acrylic acid), a cross-linked poly (N-2-hydroxyethylacrylamide), or a cross-linked poly (acrylamide/sodium acrylate), or any combination thereof.

3. The method of claim 1, comprising selecting the AIH to have a diameter of between about 250 nm and about 1500 nm.

4. The method of claim 1, comprising selecting the AIH to have a diameter of about 750 nm.

5. The method of claim 1, comprising selecting the amine from the group consisting of monoethanol amine, diethanolamine, triethanolamine, 2-piperidineethanol, and N-ethyl monoethanolamine, and combination thereof.

6. The method of claim 5, comprising mixing the aqueous amine solution to a concentration of about 30 weight % amine in water.

7. The method of claim 1, comprising:
   determining that the AIH has reached saturation when the pressure increases.

8. The method of claim 1, comprising injecting a mixed gas stream into a vessel containing the AIH, wherein the mixed gas stream comprises carbon dioxide.

9. The method of claim 8, comprising:
   measuring a concentration of carbon dioxide in an effluent stream from the vessel; and
   determining that the AIH has reached saturation with the concentration of carbon dioxide in the effluent stream increases.

10. The method of claim 1, wherein pumping the well treatment composition into a wellbore comprising a treatment zone, comprises plugging a loss composition zone.

11. The method of claim 1, wherein pumping the well treatment composition into the wellbore comprising the treatment zone, comprises plugging a water production zone.

12. The method of claim 1, wherein the well treatment composition comprises a surfactant.

13. The method of claim 12, wherein the surfactant comprises a cationic surfactant, an anionic surfactant, or a zwitterionic surfactant, or any combination thereof.

14. The method of claim 1, comprising pumping drilling mud after the well treatment composition to push the well treatment composition into the treatment zone.

15. The method of claim 1, comprising selecting the hydrogel, at least in part, on well parameters.

16. The method of claim 15, wherein the well parameters comprise a type of treatment zone, well pressure, treatment zone pressure, rock type, or pore size, or any combination thereof.

17. The method of claim 16, comprising selecting an amine based, at least in part, on well parameters.

18. The method of claim 17, wherein the well parameters comprise well pressure, or rock type, or both.

* * * * *

UNITED STATES PATENT AND TRADEMARK OFFICE
CERTIFICATE OF CORRECTION

PATENT NO. : 12,276,180 B2
APPLICATION NO. : 18/319169
DATED : April 15, 2025
INVENTOR(S) : Hala Sadeg and Amr I. Abdel-Fattah It is certified that error appears in the above-identified patent and that said Letters Patent is hereby corrected as shown below:

In the Claims

In Column 5, Line 39, Claim 2, please replace "poly (acrylic" with -- poly(acrylic --

In Column 5, Lines 39-40, Claim 2, please replace "poly (N-2-hydroxyethylacrylamide)," with -- poly(N-2-hydroxyethylacrylamide), --

In Column 5, Lines 40-41, Claim 2, please replace "poly (acrylamide/sodium" with -- poly(acrylamide/sodium --

In Column 6, Line 2, Claim 5, please replace "monoethanol amine," with -- monoethanolamine, --

Signed and Sealed this
Twenty-seventh Day of May, 2025

Coke Morgan Stewart
*Acting Director of the United States Patent and Trademark Office*